Jan. 13, 1959    C. GOODALL ET AL    2,867,965
ROTARY RAKING WHEEL

Filed Aug. 27, 1956      5 Sheets-Sheet 1

Inventors
C. Goodall
M. Goodall

Jan. 13, 1959 C. GOODALL ET AL 2,867,965
ROTARY RAKING WHEEL
Filed Aug. 27, 1956 5 Sheets-Sheet 2

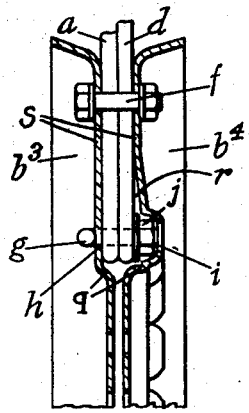
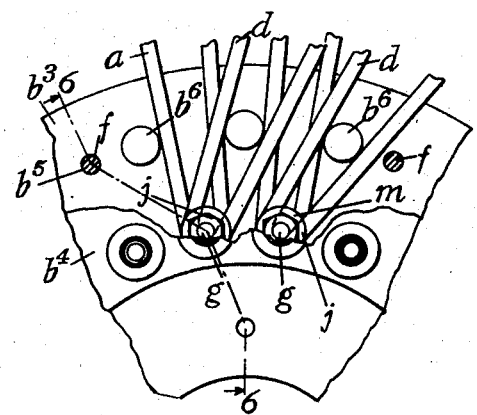
Fig.6  Fig.7
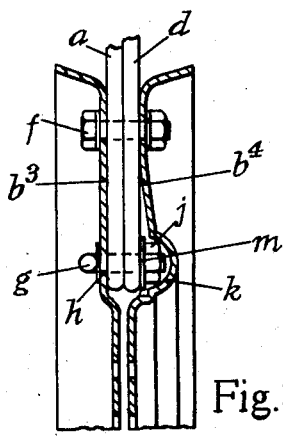
Fig.8
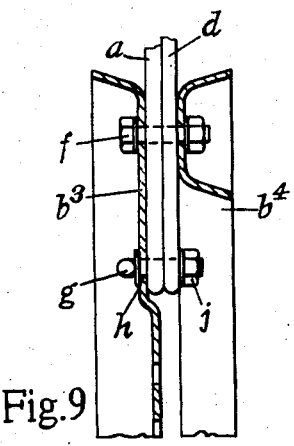
Fig.9

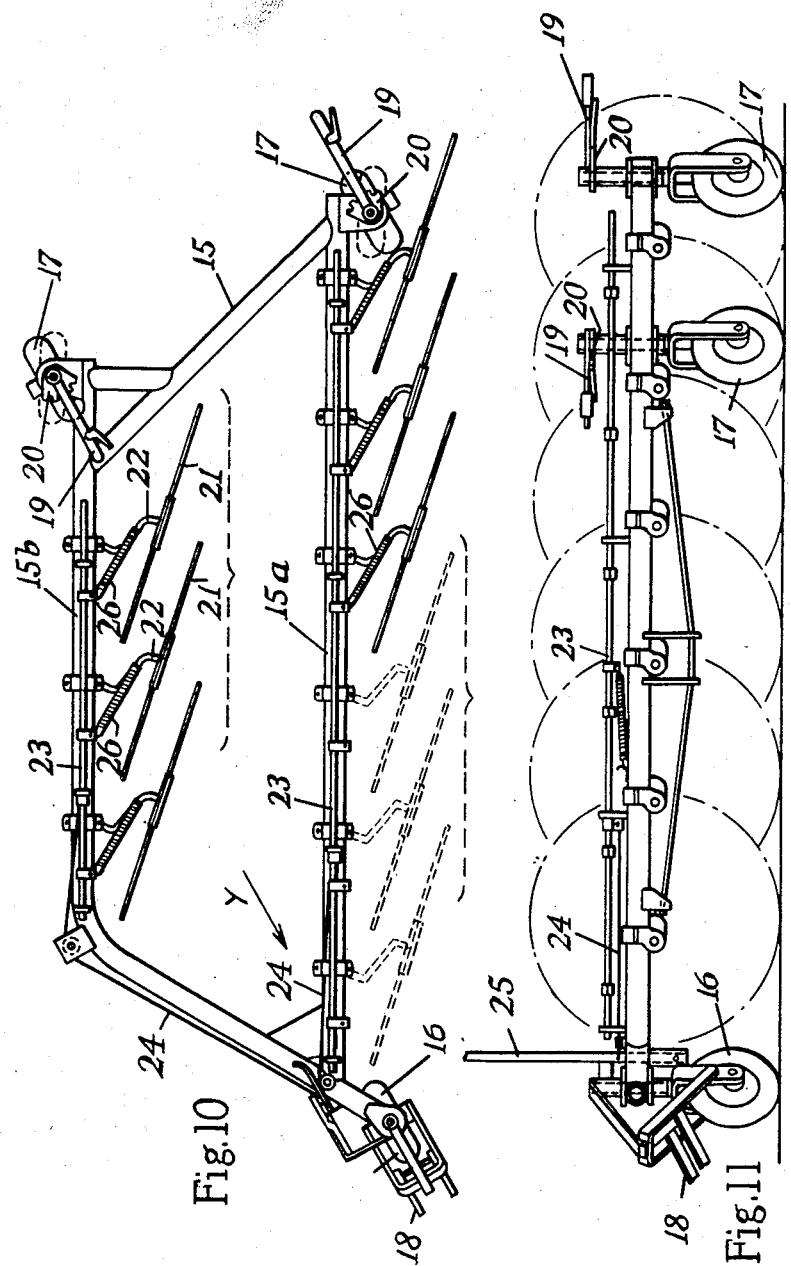

Jan. 13, 1959   C. GOODALL ET AL   2,867,965
ROTARY RAKING WHEEL
Filed Aug. 27, 1956   5 Sheets-Sheet 5

Inventors
C. Goodall
M. Goodall
By Attys.

United States Patent Office 2,867,965
Patented Jan. 13, 1959

2,867,965

ROTARY RAKING WHEEL

Charles Goodall and Maurice Goodall, Silverhill, Barton-under-Needwood, Burton-on-Trent, Straffordshire, England Application August 27, 1956, Serial No. 606,458

Claims priority, application Great Britain September 7, 1955

9 Claims. (Cl. 56—377)

This invention relates to a rotary tool for an agricultural or horticultural machine and of the knid incorporating a plurality of resilient tines.

One known form of machine for which a rotary tool in accordance with this invention is eminently suitable is a rotary rake or swath turner for raking or turning over swaths of cut grass or like material, and of the type comprising a frame adapted to be advanced over the ground, for example, by a tractor vehicle or draught animal, and a plurality of rotary tools mounted in echelon on the frame for rotation about axes inclined to the direction of travel of the machine, the arrangement being such that the tools are rotated by contact of their tines with the ground or crop as the machine is advanced.

In such a machine the forces acting upon the tines of the rotary tools are oblique to the planes in which the tines of the tools are arranged so that the tines are subject to forces acting in a direction perpendicular as well as parallel to the plane of rotation of the tool. If the tines are not sufficiently flexible in the direction of the acting forces the tools will tend to jump from the ground in use and efficient raking will not be achieved. Furthermore, if the tines are formed of light and flexible material without support adjacent their outer ends there is a tendency for each tine, under the forces acting upon it, to become permanently bent adjacent its inner end.

The present invention has for its object to provide a rotary tool in a convenient form which will minimise these disadvantages.

The rotary tool, however, is not limited in its application to a rotary rake or swath turner as it may be used on other agricultural or horticultural machines. For example, the tool may be used on a machine for thinning rows of seedlings or other small plants in which case it can be positively driven either from the engine of a tractor vehicle by which it is being towed or upon which it is mounted, or from ground wheels of the machine. Furthermore the tool can be rotatable about an axis inclined or parallel to the direction of travel of the machine.

According to the invention a rotary tool of the kind specified for an agricultural or horticultural machine comprises the combination of a hub, a plurality of resilient tines secured at their inner ends to the hub, and a corresponding number of resilient links secured to and extending from the hub and having separate outer ends respectively connected to the outer end portions of the tines, each link being shaped to extend across an intermediate portion of at least one tine other than that to which the outer end of the link is connected, so that the tines and the links extending across them bear against one another when the outer ends of the tines are flexed in one direction laterally of the tool.

In the accompanying drawings:

Figure 6 is a sectional end view of a modified form of hub, the section being taken on the line 6—6 of Figure 7.

Figure 7 is an elevational view showing (with parts broken away) the right hand side of the hub seen in Figure 6.

Figure 8 is a similar view to Figure 6 showing a slightly modified construction.

Figure 9 is a similar view to Figure 6 showing a further modification of the hub, and Figures 10 and 11 are respectively a plan and a side elevation of a rotary rake or swath turner incorporating tools in accordance with the invention.

Figure 1:
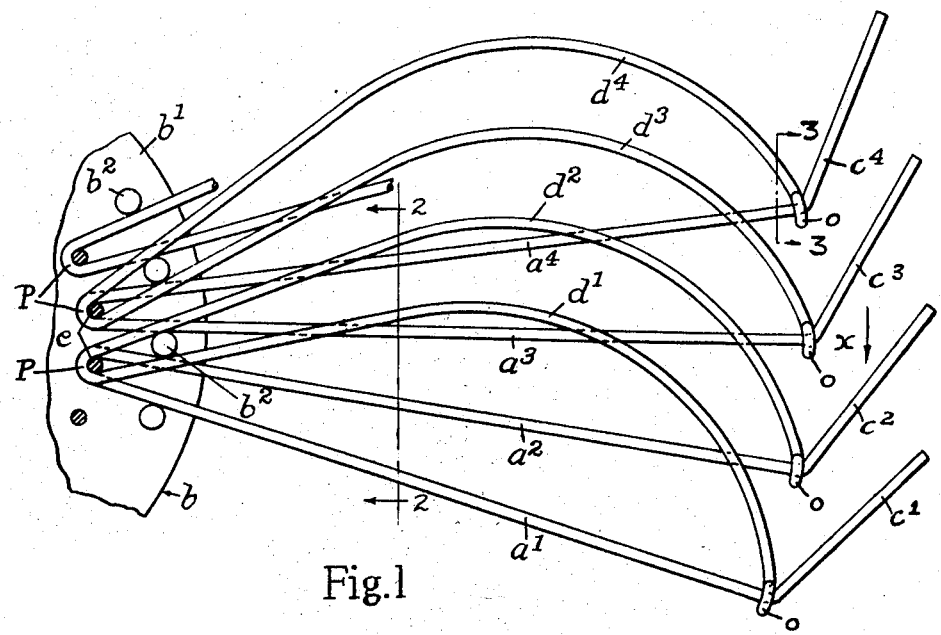
Figure 1 is a fragmentary elevational view with parts broken away and shown in section of a rotary tool in accordance with the invention.

The rotary tool comprises a plurality of substantially radial tines of which only four designated $a^1$, $a^2$, $a^3$, and $a^4$ are shown in the drawings. The inner ends of these tines are secured to a hub $b$, whilst the outer ends are bent over to form teeth $c^1$, $c^2$, $c^3$, and $c^4$. Interconnecting the outer end of each tine with the hub $b$ is a link, the links associated with the tines $a^1$, $a^2$, $a^3$, and $a^4$ respectively being designated $d^1$, $d^2$, $d^3$, and $d^4$. The tines and links are made of strong but flexible and resilient steel or other wire, and the outer end of each link is connected to the outer end of its associated tine by bending the wire of the link around the tine to form a loop $o$ as seen in Figure 3. Each link is bent so that it extends across the tine adjacent to that with which it is associated, and preferably, as shown, extends across two tines. For this purpose the links may be bowed as seen in Figures 1 and 4, or may be cranked as seen in Figure 5.

Figures 2, 3:
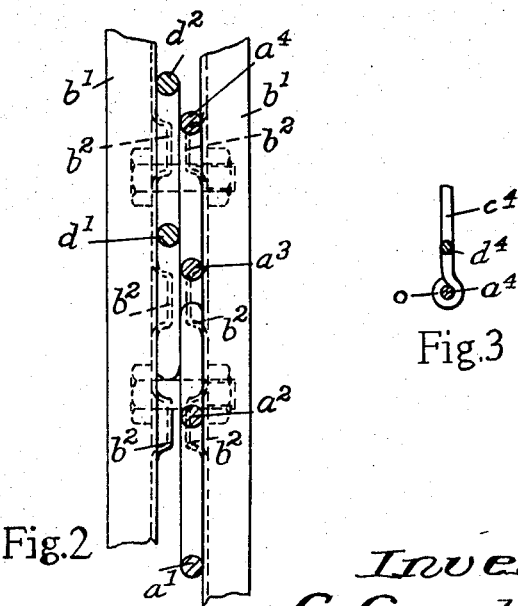
Figure 2 is a sectional end view taken on the line 2—2 of, and drawn to a larger scale than, Figure 1.
Figure 3 is a section on the line 3—3 of Figure 1.
Figure 4:
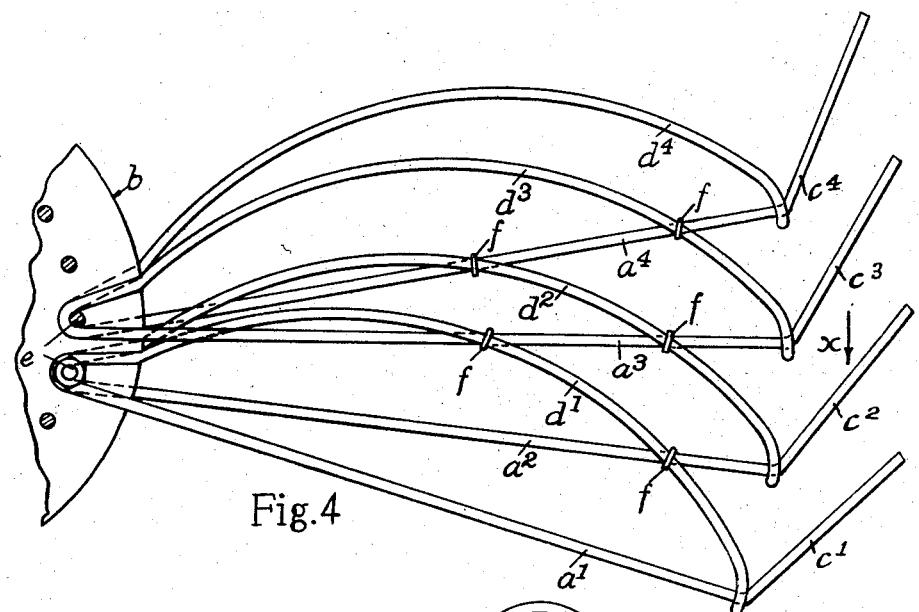
Figures 4 and 5 are views similar to, and illustrating modifications of the rotary tool shown in, Figure 1.
Figure 5:
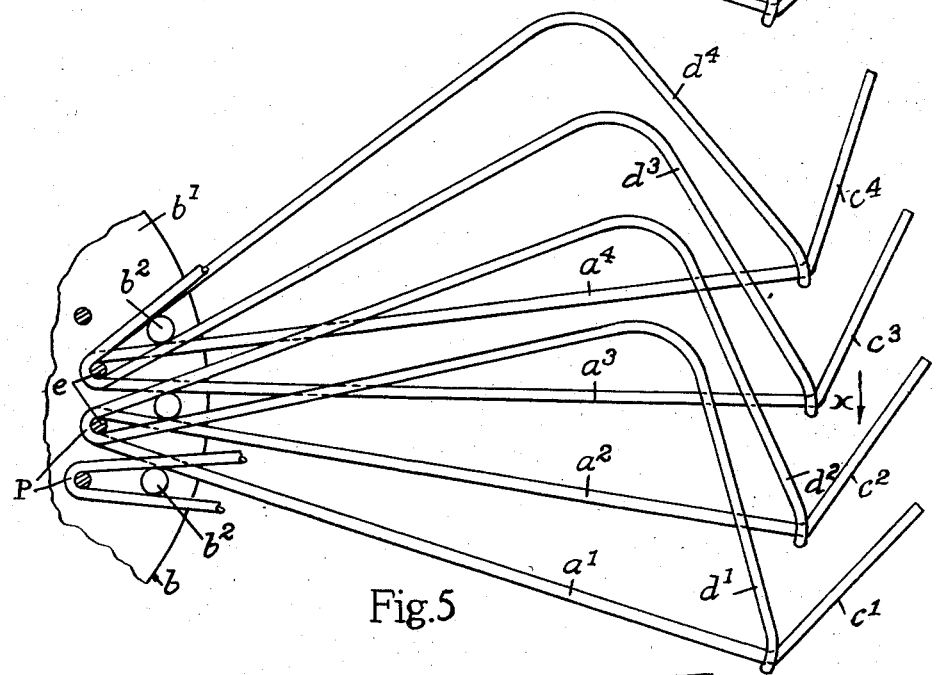

As seen in Figures 1 and 5 pairs of adjacent tines such as $a^1$ and $a^2$, and $a^3$ and $a^4$ are each formed from a single length of wire bent at $p$ mid-way in its length to form two limbs which constitute the two tines. Also pairs of adjacent links, such as $d^1$ and $d^2$, and $d^3$ and $d^4$ are each formed from a similar single length of wire. Alternatively, as seen in Figure 4, each tine $a^1$, $a^2$, $a^3$, and $a^4$ and its associated link $d^1$, $d^2$, $d^3$, and $d^4$ respectively may be formed from a single length of wire.

It will be noted that in all the illustrated constructions the links are disposed at the same side of the tines across which they extend. In use the tool is intended to be assembled upon the machine so that the tines are in front of the links across which they extend when considered in the direction of travel of the machine. Thus as a tine (such as $a^1$) and its associated link $d^1$ are flexed laterally relative to the tool as a whole, the link $d^1$ will bear against the tines $a^2$ and $a^3$ across which it extends. The tines $a^2$ and $a^3$ therefore serve to resist lateral flexing of the tine $a^1$ by supporting the link $d^1$ resiliently intermediate its ends. Flexure of the tine $a^1$ in the plane of the tool however, is resisted by the link $d^1$ independently of the adjacent tines, the link forming a resilient support for the outer end of the tine. Each link is behind its associated tine, when the tine is in contact with the ground, the tools being adapted to rotate in the direction of the arrows designated X in Figures 1, 4 and 5.

The hub $b$ may be a single annular disc as seen in Figure 4 to which the inner ends of the tines and links are connected by bolts $e$ and associated nuts, in which case at the points at which a link crosses over the tines the link and tines are interconnected by wire loops $f$ to retain the tines at the correct angular setting relative to the hub. Alternatively, the hub may be formed as shown in Figures 1, 2 and 5, by two peripherally flanged annular discs $b^1$ interconnected back to back by bolts $e$ and associated nuts. These nuts and bolts serve also to retain the tines and links, the inner ends of which are clamped between the two discs $b^1$. Also there are pressed up from the back faces of the discs $b^1$ protuberances $b^2$ which are disposed between the limbs of the folded lengths of wire as shown and thereby serve to prevent angular movement of the tines and links.

In the development of the invention it has been found desirable to be able to replace a selected tine without disconnecting the other tines and links from the hub. Such a desideratum is not possible with the construction of hub shown in Figures 1, 2 and 5, and it has therefore been found desirable to employ a modified construction in accordance with Figures 6 and 7, or Figure 8 or 9, wherein the tines and links may be arranged in accordance with any of the examples previously described.

In the construction illustrated in Figures 6 and 7, the hub is formed from a pair of peripherally flanged annular discs $b^3$, $b^4$ bolted together with their flanges directed outwardly. Each disc has an annular shoulder $q$ formed so as to provide an annular gap $r$ between the outer marginal edges $s$ of the two discs and within this gap are located the inner ends of the tines $a$ and links $d$. The bolts $f$ interconnecting the discs $b^3$, $b^4$ pass through annularly arranged rows of holes $b^5$ in the two discs adjacent their peripheries, and between these holes each disc has formed on it inwardly directed protuberances $b^6$ which serve to retain the links and/or tines from angular movement. In a preferred construction in which pairs of adjacent tines $a$ are formed from a single length of wire, and pairs of adjacent links $d$ are formed from a single length of wire as seen in Figure 1, then these protuberances are located between the adjacent links forming a pair as shown in Figure 7.

The inner ends of the links $d$ and tines $a$ are secured to the disc $b^3$ by means of bolts $g$ passing through an inner annular row of holes $h$ in this disc. The other disc $b^4$ also has an inner annular row of holes $i$ but these are plunged outwardly to accommodate nuts $j$ engaging the bolts $g$, the arrangement being such that the marginal edges of these holes $i$ bear against the nuts $j$ and prevent them from becoming slackened. Alternatively and as seen in Figure 8 the disc $b^4$ may have an annular groove $k$ to accommodate and retain the nuts $j$ on the bolts $g$ securing the tines and links. The bolts $g$ may conveniently have T-shaped heads, and washers $m$ are provided between the tines and links and the nuts $j$.

With such constructions when the bolts $f$ interconnecting the pair of discs are removed the links and tines are still firmly connected to the disc $b^3$. Thus it is possible to remove and replace one or more tines or links without disturbing the others.

Figure 7A:
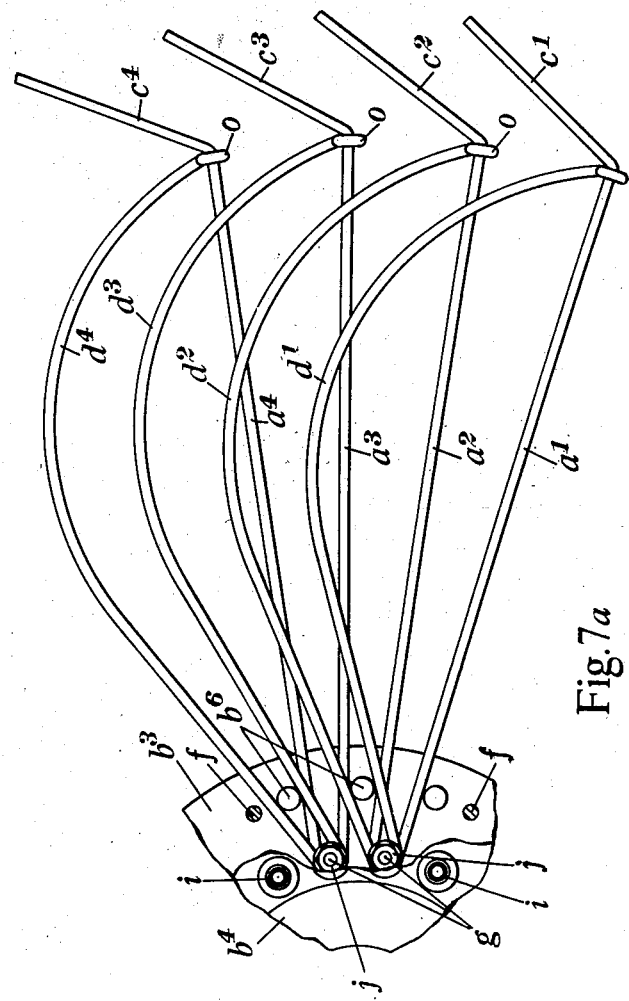
Figure 7a is a view similar to Figure 1 illustrating the tines and links shown in Figures 6 and 7 applied to the hub shown in Figures 6 and 7.

Figure 7a illustrates the tines and links of the example shown in Figure 1 in conjunction with the hub shown in Figures 6 and 7.

In the construction shown in Figure 9 the disc $b^3$ is as in Figures 6 and 8, but the other annular disc $b^4$ is relatively narrow in a radial direction and is of channel cross-section. This disc $b^4$ includes inwardly directed protuberances as before described, but does not overlap the bolts $g$ securing the tines and links to the disc $b^3$.

In Figures 10 and 11 is shown a typical machine for raking or turning over swaths of cut grass or the like and incorporating a plurality of rotary tools in accordance with any of the constructions hereinbefore described.

The machine comprises a frame 15 mounted upon a front castor wheel 16, and a pair of rear castor wheels 17. The castor wheel 16 is capable of free swivelling movement relative to the frame and is provided with a tow bar or other draught connector 18 whereby it may be connected to a tractor vehicle or draught animal. The wheels 17 are each adapted to be set at a selected angular disposition relative to the frame. For this purpose a handle 19 is provided on the pivot post of each castor wheel 17 this handle carrying a manually releasable catch for co-operation with a selected one of a series of notches on a segment 20 secured to the frame.

It will be understood that the angular setting of the wheels 17 will determine the angular setting of the frame relative to its direction of travel. When the machine is to be advanced, for example, along a narrow road, the wheels 17 are set as shown in broken lines in Figure 10, so that the machine is of minimum width transversely to its direction of travel. In use however, the longitudinal axis of the frame is adapted to be inclined to the direction of travel and a typical setting is shown in Figure 10 wherein the direction of travel is indicated by the arrow Y.

Each rotary tool 21 is mounted for free rotation on the one end of a cranked arm 22 which is capable of angular movement on the frame 15. When the machine is intended for turning over swaths of cut grass or the like some of the arms 22 are pivotally mounted on the longitudinal side members $15^a$ of the frame and some on the longitudinal side members $15^b$ as shown in Figure 10, but when the machine is intended for raking the arms on the member $15^b$ are removed and mounted on the member $15^a$ in the positions shown in broken lines in Figure 10.

On each side member $15^a$ and $15^b$ is mounted a longitudinally slidable bar 23 to which movement may be imparted through cables 24 by a shaft 25. Moreover, each bar 23 is interconnected with the outer end of each of the arms 22 on the same side member by a coiled tension spring 26. In use the springs 26 serve to reduce the weight of the tools acting upon the ground or crop, whilst by moving the bars 23 in one direction the tension on the springs can be so increased as to raise the tools from the ground to an inoperative position.

By this invention a rotary tool of robust and simple form is provided, which has the flexibility required by the uses aforementioned, and which permits of the ready removal and replacement of selected tines and/or links.

Having thus described our invention what we claim as new and desire to secure by Letters Patent is:

1. A rotary tool of the kind specified, for an agricultural or horticultural machine, comprising the combination of a hub, a plurality of resilient tines secured at their inner ends to the hub, and a corresponding number of resilient links secured to and extending from the hub and having separate outer ends respectively connected to the outer end portions of the tines, each link being shaped to extend across an intermediate portion of at least one tine other than that to which the outer end of the link is connected, so that the tines and the links extending across them bear against one another when the outer ends of the tines are flexed in one direction laterally of the tool.

2. A rotary tool as claimed in claim 1, in which the links are constructed in pairs, each such pair consisting of a single length of wire bent to provide two limbs constituting the corresponding links.

3. A rotary tool as claimed in claim 1 in which each tine and the link secured thereto consist of a single length of wire bent to provide two limbs one of which constitutes the tine, whilst the other constitutes the link.

4. A rotary tool as claimed in claim 1, in which the links are of bowed form.

5. A rotary tool as claimed in claim 1, in which the links are of cranked form.

6. A rotary tool as claimed in claim 1, and having means connecting the links to the tines across which they extend.

7. A rotary tool as claimed in claim 1, in which the hub is composed of two discs, and bolts interconnecting the discs, said discs having on their adjacent faces protuberances which serve to prevent angular movement of the tines and links.

8. A rotary tool as claimed in claim 1, in which the hub is composed of two discs, and a series of nuts and bolts interconnecting the discs, and in which there is provided a second series of nuts and bolts connecting the tines and links to one of the discs, said discs having on their adjacent faces proturberances which serve to prevent angular movement of the tines and links.

9. A rotary tool as claimed in claim 1, in which the hub is composed of two discs, and a series of nuts and bolts interconnecting the discs, and in which there is provided a second series of nuts and bolts connecting the tines and links to one of the discs, the other of the discs serving as a locking device for the last mentioned nuts, and said discs having on their adjacent faces protuberances which serve to prevent angular movement of the tines and links.

References Cited in the file of this patent

UNITED STATES PATENTS

| 514,989 | Gibbs | Feb. 20, 1894 |
| 1,497,526 | Martin | June 10, 1924 |

FOREIGN PATENTS

| 512,929 | Belgium | Mar. 5, 1954 |
| 1,106,720 | France | July 27, 1955 |